(12) United States Patent
Kosanovic et al.

(10) Patent No.: US 6,996,231 B2
(45) Date of Patent: Feb. 7, 2006

(54) STEP SIZE CONVERGENCE CONTROL

(75) Inventors: Bogdan Kosanovic, Bethesda, MD (US); Yimin Zhang, Germantown, MD (US)

(73) Assignee: Texas Instruments Incorporated, Dallas, TX (US)

( * ) Notice: Subject to any disclaimer, the term of this patent is extended or adjusted under 35 U.S.C. 154(b) by 546 days.

(21) Appl. No.: 09/987,046

(22) Filed: Nov. 13, 2001

(65) Prior Publication Data

US 2003/0092473 A1  May 15, 2003

(51) Int. Cl.
  *H04M 9/08* (2006.01)
(52) U.S. Cl. ............................ 379/406.09; 379/406.01; 379/406.02; 379/406.06; 379/406.08; 379/406.1; 379/406.11
(58) Field of Classification Search ................................. 379/406.01–406.16
  See application file for complete search history.

(56) References Cited

U.S. PATENT DOCUMENTS

| | | | | |
|---|---|---|---|---|
| 4,912,758 A | * | 3/1990 | Arbel | 379/388.01 |
| 5,592,548 A | * | 1/1997 | Sih | 379/406.01 |
| 5,687,229 A | * | 11/1997 | Sih | 379/406.01 |

OTHER PUBLICATIONS

Zerguine et al, "Hubrid LMS-LMF algorithm for adaptive echo cancellation", 1999, IEE Proc.-Vis. Image Process, vol. 146, No. 4, Aug. 1999; pp. 173-180.*

* cited by examiner

*Primary Examiner*—Sinh Tran
*Assistant Examiner*—Rammandan Singh
(74) *Attorney, Agent, or Firm*—Abdul Zindani; Wade James Brady, III; Frederick J. Telecky, Jr.

(57) ABSTRACT

A method of converging a step size control for an adaptive filter of a communication channel including: (1) initializing a nominal step size value and a penalty point value; (2) combining the nominal step size value and the penalty point value to generate a step size value; and (3) dynamically changing the step size value in response to a characteristic measure of a quality of the communication channel. The step size value is changed by adjusting the nominal step size value, the penalty point value, or both. In a preferred embodiment the penalty point value is adjusted dependant on: (1) a tone originating from the far end (2) full convergence (3) the power level of a residual error signal (4) the channel's near-end background noise and/or (5) weak double-talk in the communication channel. The nominal step size value is adjusted when an achieved initial combined loss is about 15 dB or greater and is reset by divergence.

8 Claims, 2 Drawing Sheets

STEP SIZE CONVERGENCE CONTROL

CROSS REFERENCE TO RELATED APPLICATIONS

Not applicable.

FIELD OF THE INVENTION

The present invention relates to the reduction of echo signals in a telecommunication link. This is accomplished by better adaptively matching the echo canceller characteristics to the transmission path characteristics. More specifically, a method of controlling a step size for an adaptive filter of an echo canceller is taught.

BACKGROUND OF THE INVENTION

Referring to FIG. 1, a representative implementation of a telephone network link 1 is illustrated. Hybrid circuit 2 connects a near-end user telephone 5 to the network 1 and hybrid circuit 9 connects a far-end user 11 to the network 1. Since the trunk 13 interconnecting the near-end central office 12 and the far-end central office 14 conveys digital communications, analog-to-digital (A/D) converters 3 and 10 connect the transmitter side of the hybrid circuits at each end of the network, to the digital trunk circuit 13. Similarly, digital-to-analog (D/A) converters 4 and 8 connect the receiver side of the hybrid circuit to the digital trunk circuit 13. Using this network structure, an end-to-end voice communication may take place between two end-user devices 5 and 11 of the telephone network.

Each hybrid circuit 2, 9 is a converter that interconnects a two-wire circuit of the telephone to a four-wire circuit of the central office 12, 14. Both the two-wire and four-wire circuits support the simultaneous communication of transmit and receive signals. However, the four-wire circuit of the Public Switched Telephone Network (PSTN) uses one wire pair for the transmit signal and the other wire pair for the receive signal, while the two-wire circuit must carry both the transmit and receive signals on a single wire pair. Because the transmit and receive signals are duplexed on the single wire pair, part of the transmitted signal energy 18 and/or 16 originating from the telephone 5 and/or 11 can be reflected back to the telephone by the hybrid circuits 9 and 2, respectively. This reflected energy, though delayed in time, substantially replicates the transmitted signal and causes undesirable interference. When the transmitted signal is human speech, the speaker may hear his or her own speech in the receiver as a delayed and attenuated echo.

For example, when a user speaks into telephone 5 the voice signal energy is transmitted to telephone 11 through hybrid 9. Echo is created when the transmitted signal is reflected back by the hybrid circuit 9 and passes through the PSTN to the originating telephone. This echo is annoying to the users of the communication link.

The quality of the communication link may be improved by subtracting a replica of the originally transmitted signal from the echo signal generated by the hybrid circuit at the far-end of the communication link. Since the signal transmitted by the hybrid circuit at the far end contains both the echo and the far-end user's voice signal of interest, subtracting the replica of the originally transmitted near-end signal from the transmitted far-end signal will reduce or eliminate the echo, and retain the far-end user's voice signal.

As illustrated in FIG. 1, signal splitter 15 provides the signal 18a to D/A 8 and to filter 19 which provides a negative replica −18 of the originally transmitted signal 18 to a combiner circuit 17 at the same time the combined echo signal 18' and far-end signal of interest 16 is provided to the combiner circuit 17. The echo canceller circuit 7 contains amplification/attenuation circuitry that attempts to match the amplitude of the replica signal −18 with that of the echo signal 18'. By precisely matching the absolute values of the signal amplitudes of the negative replica −18 and the echo signal 18', as they are provided to the combiner circuit 17, the echo may be removed entirely from the signal 16a received by the near-end user. However, the complete removal of the echo only occurs under ideal conditions. After being summed by the combiner 17, the sum of the signal energies is conveyed to the near-end telephone receiver as signal 16a.

A real-world implementation of the communication link represented by FIG. 1 does not provide the ideal conditions needed to entirely eliminate the signal. The original signal information contained in the echo signal 18', which is received by the combiner 17, is distorted by the non-linearities present in the A/D and D/A conversions that the original signal 18 has undergone.

The $\mu$-law or A-law A/D and D/A conversions experienced within the transmission path are nonlinear in nature and present a significant problem to the linear adaptive filter 19 typically used in echo cancellers. Additional signal distortion is caused by the non-linearity of the hybrid circuit 9. The linear adaptive filter 19 cannot match the non-linear distortions introduced by the $\mu$-law or A-law conversions and the hybrid circuit 9 and, as a result, cannot cancel them. Therefore, a typical voice communication link over the PSTN is subject to echo that cannot be completely cancelled using conventional approaches, such as linear adaptive filtering. In essence, the echo canceller synthesizes the estimated echo, which is subtracted from the composite signal (16, 18') of the combined far-end signal of interest 16 and echo 18'. Together, the signal distortion caused by the non-linearities of the multiple conversions and the inability of the echo canceller to precisely model the true echo path limit the realizable echo rejection.

SUMMARY OF THE INVENTION

The present invention provides a substantial improvement over the prior art in the reduction of an echo signal in a telecommunication link. This is accomplished by better adaptively matching the echo canceller characteristics to the transmission path characteristics.

The present invention discloses a method of converging a step size control for an adaptive filter of a communication channel. This method has the steps of: (1) initializing a nominal step size value and a penalty point value; (2) combining the nominal step size value and the penalty point value to generate a step size value; and (3) dynamically changing the step size value in response to a characteristic measure of a quality of the communication channel. With this method, the step size value is changed by adjusting the nominal step size value, the penalty point value, or both the nominal step size value and the penalty point value. In a preferred embodiment of the invention, the step size value is decreased by adjusting the penalty point value when: (1) a tone originating from the far end of the communication channel is detected, to prevent the adaptive filter from diverging; or (2) full convergence is achieved; or (3) a power level of a residual error signal, $P_e$, is less than −60 dBm0 or (4) a power level of a far-end channel signal, $P_x$, is less than −45 dBm0; or (5) a level of the channel's near-end background noise is high; or (6) weak double-talk in the communication channel is detected. The step size value is decreased by adjusting the nominal step size value when an achieved initial combined loss is about 15 dB or greater. On the other hand, the step size value is reset upon detection of an adaptive filter reset that may be triggered by divergence between the adaptive filter and a speech signal in the communication channel. Additionally, the step size value is reinitialized at the beginning of every forty sample block period, which is 5 ms when an 8 kHz sampling rate is used.

BRIEF DESCRIPTION OF THE DRAWINGS

Preferred embodiments of the invention are discussed hereinafter in reference to the drawings, in which.

DETAILED DESCRIPTION OF PREFERRED EMBODIMENTS

Figure 1:
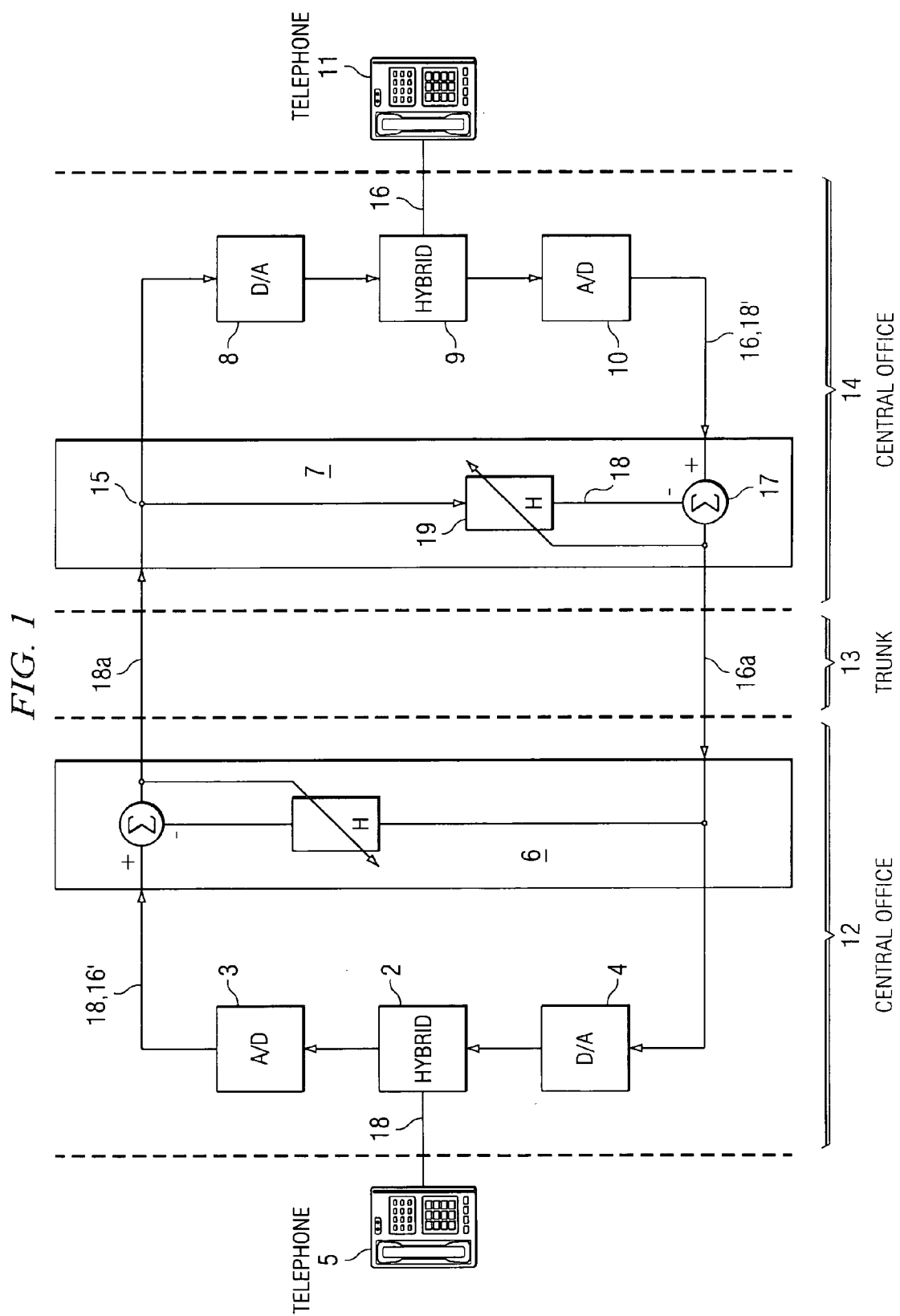
FIG. 1—illustrates a representative implementation of a telephone network link.
Figure 2:
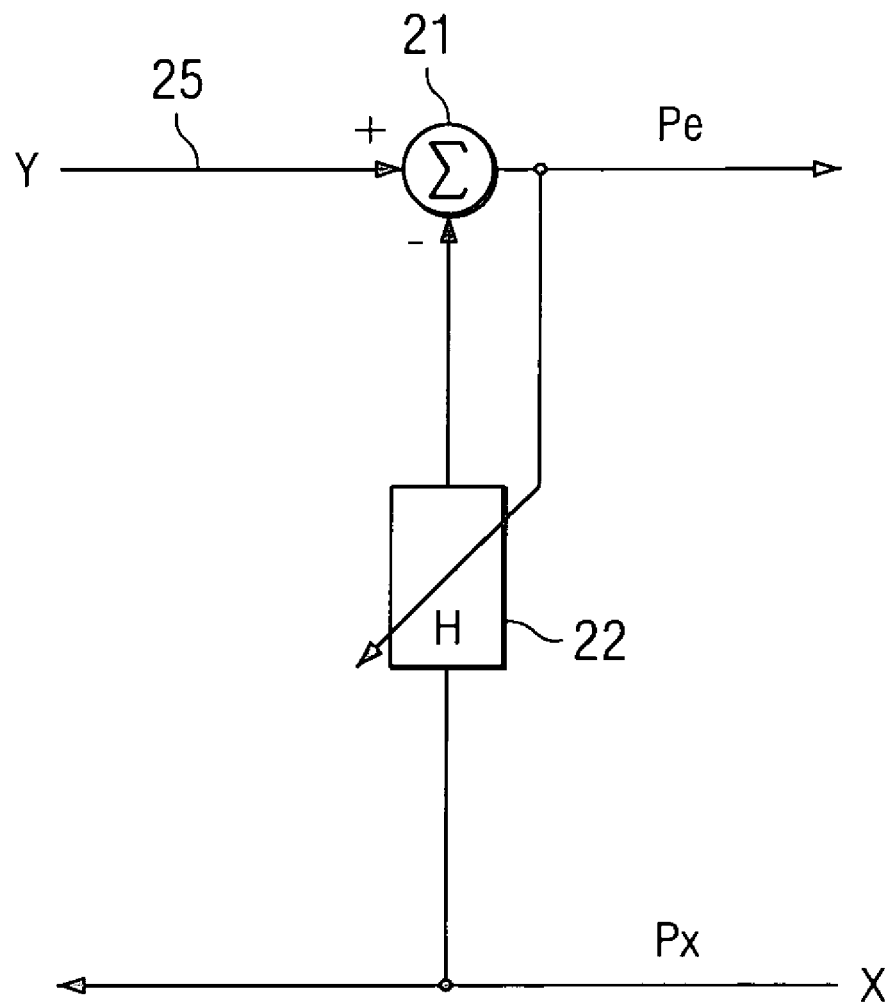
FIG. 2—illustrates a representative echo canceller circuit implemented by an adaptive least mean square algorithm device having a combiner and a digital transversal filter.

FIG. 2 illustrates a representative echo canceller circuit 20 implemented by an adaptive least mean square (LMS) algorithm device having a combiner 21 and a digital transversal filter 22. The transfer characteristic of the echo canceller circuit 20 may be expressed by the equation:

$$e_k[m]=y[m]-x_k[m]*h_k[m]$$

where * is the convolution operator and $h_k[m]$ are the filter coefficients for the $k^{th}$ iteration of the LMS algorithm. The filter coefficients are generated by the equation:

$$h_k+1[n]=h_k[n]+\mu \cdot e_k[m] \cdot x_k[m-1]$$

where e[m] is the error signal 23, x[m] is the far-end excitation 25, and $\mu$ is the step size.

The step size for the normalized LMS algorithm can be expressed as:

$$\mu = \frac{2 \cdot \mu_0}{f(P_x) \cdot g(N)}$$

where $\mu_0$ is the nominal step size, $P_x$ is the far-end power, N is the filter length in taps, and f( ) and g( ) are suitable monotone, non-decreasing functions.

The step size regulates the convergence of the adaptive filter characteristics and the transmission path characteristics in following ways. A small step size value provides greater mathematical stability in the algorithm but slows the rate of convergence. A large step size value provides faster convergence but less stability. For arbitrary speech signals, it is not possible to determine a single value of the nominal step size that would always work best. The speech power is not constant and may change with every syllable. Similarly, the background noise during the conversation may vary as well. Prior art fixed-point algorithms have difficulty due to quantization effects in converging the filter and transmission path characteristics whenever the signal levels become very low and also whenever substantial near-end noise is present. Additionally, when people on both ends of the communication link talk at the same time (double-talk) the convergence algorithm may need to be temporarily discontinued or slowed.

For these reasons, the present invention adjusts the step size in real-time based on several conditions. Control of the step size adjustment is bifurcated into a nominal step size selection and a step size correction.

The nominal step size selection is implemented through a finite state machine. A large nominal step size is used during the initial convergence. After a certain level of convergence is achieved, the nominal step size is reduced. Stated in other words, an aggressive step size is used until the adaptive algorithm makes significant progress in converging the filter and transmission path characteristics. Thereafter, a more conservative value of the nominal step size is used.

The two states of the state machine are termed the small and large step size states. A conservative value of the nominal step size, for example $\mu_{0,s}$=0.125, is used when the state machine operates in the small state and a more aggressive value, such as $\mu_{0,l}$=0.25, is used when in the large state of operation. The initial state of operation for the finite state machine is the large state. When the combined loss exceeds 15 dB, the state changes to the small state. A transition from the small to the large state can also be implemented for various situations, such as a filter and channel characteristic divergence, a filter-reset operation, an echo path change detected, etc. The nominal step size selection may be generalized to use additional states if more precise control of the rate of convergence and algorithmic stability is needed.

Since there are many other independent conditions that may require changes in step size, the present invention also adjusts the step size through a system of "penalty points." Applying a base two logarithm to the previous equation for the step size, $\mu$, and assigning the result to a variable, m, provides the following equation:

$$m=\log_2(\mu)=1+m_0-p_x-n$$

where $m_0=\log_2(\mu_0)$, $p_x=\log_2(f(P_x))$, and $n=\log_2(g(N))$. For the purpose of describing the invention with simplicity, assume:

$$f(x)=2^{\lfloor log_2(x) \rfloor} \text{ and } g(x)=2^{\lceil log_2(x) \rceil}.$$

The penalty points, $\rho$, will be subtracted from the step size, as expressed by the equation:

$$m=\log_2(\mu)=1+m_0-p_x-n-\rho$$

Penalty points may have positive or negative integer values. A positive penalty point has the effect of decreasing the step size, a negative penalty point has the effect of increasing the step size, and a zero penalty point has no effect on the step size.

Penalty points are used to adjust the step size whenever a short-term change is needed. The nominal step size is fundamental to the convergence algorithm and changes to this value should only be made when: (1) the filter length, N, changes; (2) the far-end power, $P_x$ changes; or (3) initial convergence is achieved. Temporary changes to the step size should be segregated from the algorithm's fundamental properties to allow orthogonality of the algorithm. In other words, segregating the short- and long-term adjustments to the step size provides a modeling, design, and implementation capability that is independent of the nominal step size control.

In a preferred embodiment of the invention, with reference to FIG. 2, the penalty points are adjusted under the following conditions. A positive penalty point is added when a tone is detected in the far-end exicitation 24. Decreasing the step size in this instance helps to minimize the extent to which the adaptive filter might diverge. A positive penalty point is added when full convergence is achieved. When the adaptive filter has fully converged on the voice signal, decreasing the step size increases the stability of the achieved convergence. A high achieved combined loss is indicative of full convergence. International Telecommunication Union (ITU-T) Recommendation G. 168, which is hereby incorporated by reference into this application, provides another measure of full convergence. Full convergence may also be described as the point where further convergence is constrained by the hardware limitations or where further convergence would be audibly imperceptible to the users of the telephone link. Other ways of defining convergence that are obvious to one of ordinary skill in the art, based upon this disclosure, may be used and are deemed to be part of this disclosure.

In a preferred illustrated embodiment of the invention, a positive penalty point is added when the residual $p_e$ or far-end excitation $p_x$ levels are very low. For example, when the echo canceller's residual error power, $p_e$, is less than −60 dBm0 or the far-end excitation power, $p_x$, is less than −45 dBm0 the filter is better able to converge and the decreased step size will better stabilize the convergence. One or more penalty points are added when the background noise originating from the near-end terminal 25 is moderate or high. For example, two points can be added for high noise and one point can be added for moderate background noise. In an exemplary embodiment, moderate noise has a level of between about −55 dBm0 and −45 dBm0 and high noise has a level above about −45 dBm0 or more. Similarly, one or more penalty points are added when weak double-talk is detected in the link. This condition occurs when the amplitude of the near-end talker's voice has a much lower level than the far-end talker's voice and may be detected by the presence of a near-end speech level that is considerably above the noise floor when far-end speech is present. For example, weak double-talk may also be described as a condition where the near-end speech signal is about 6 dB below the far-end speech signal, but still 12 dB above the noise floor.

Other values of penalty points may be added or subtracted in the examples provided above, since the values indicated are exemplary and not limiting. Additionally, negative penalty points may be added to increase the convergence rate. The conditions for adding negative penalty points may be the inverse of those discussed above for adding positive points or may be some other identifiable condition. For example, negative penalty points are appropriate in a situation where the nominal step size is adjusted for a very conservative environment that assumes the constant presence of high noise levels.

In a preferred embodiment, the total number of penalty points is limited to a maximum value to prevent the rate of convergence from falling below a particular level. Moreover, the number of penalty points is reinitialized to zero periodically. Preferably, the value of the penalty points, ρ, is recalculated for each of the forty samples taken in a sampling block, which is a 5 ms period using a 8 kHz sampling rate. For every block, the penalty points are initialized to zero. However, the block period, sampling rate, reinitialization period, and recalculation period may have other values to suit the particular application of the invention. The important aspect of dynamically adjusting the penalty points is to adjust them based on the changes in the environment of the communication link and the achieved performance of the adaptive filter.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A method of converging an adaptive filter of a communication channel between a near end and a far end, and having a hybrid connection responsible for transmission echo of near end signal, comprising the steps of:
   initializing a nominal step size value and a penalty point value;
   combining said nominal step size value and said penalty point value to generate a step size value; and
   dynamically changing said step size value in response to a characteristic measure of a quality of said communication channel, wherein said step size value is decreased:
     by adjusting said penalty point value when a tone originating from the far end of the communication channel is detected;
     by adjusting said penalty point value when full convergence is achieved;
     by adjusting said nominal step size value when an achieved combined loss is approximately 15 dB;
     by adjusting said penalty point value when a power level of a residual error signal, $P_e$, is less than −60 dBm0 or a far-end channel signal, $P_x$, is less than −45 dBm0, that is when $P_e$<−60 dBm0 or $P_x$<−45 dBm0;
     by adjusting said penalty point value when a level of said channel's near-end background noise is high; and
     by adjusting said penalty point value when weak double-talk in said communication channel is detected.

2. The method of claim 1, wherein:
said step size value is reset by adjusting said nominal step size value when divergence is detected.

3. The method of claim 1, wherein:
said penalty point value is reinitialized periodically.

4. The method of claim 3, wherein:
said period of reinitializing said penalty point value is once every 40 samples.

5. The method of claim 4, wherein:
said period corresponds to 5 ms for a 8 kHz sampling rate.

6. The method of claim 4, wherein:
said step size value is decreased by adjusting said nominal step size value when a combined loss exceeds 15 dB.

7. The method of claim 4, wherein:
said step size value, $\mu$, is expressed by the equation $\log_2(\mu)=1+\log_2(\mu_0)-\log_2(f(P_x))-\log_2(g(N))-\rho$, where ρ represents said penalty point value, $\mu_0$ represents said nominal step size value, $f(P_x)$ is a function of a far-end power measured within said channel, $g(N)$ is a function of the taps of said adaptive filter; and
ρ has a positive or negative integer value of zero, one, or two assigned to it for every sample within said reinitializing period.

8. The method of claim 1, wherein:
said weak double-talk is detected in said communication channel when a near-end speech signal is at least 6 dB less than a far-end speech signal and at least 12 dB above a noise floor.

* * * * *